United States Patent [19]

Reed

[11] 4,031,820
[45] June 28, 1977

[54] AUTOMATIC LIFTING AND LOWERING MECHANISM FOR DEEP FRYERS

[75] Inventor: Buckley R. Reed, Jeffersontown, Ky.

[73] Assignee: Reed & Associates, Inc., Jeffersontown, Ky.

[22] Filed: Feb. 13, 1976

[21] Appl. No.: 657,846

[52] U.S. Cl. .............................. 99/336; 55/223; 99/407; 99/408; 99/448

[51] Int. Cl.² ............................................ A47J 37/12

[58] Field of Search ............ 99/335, 336, 334, 342, 99/403, 408, 410, 413, 444, 448, 407, 450; 55/223, 228, DIG. 36; 126/299 R, 299 A, 299 B; 98/115 K; 134/143, 162, 164

[56] References Cited

UNITED STATES PATENTS

| | | | |
|---|---|---|---|
| 1,284,454 | 11/1918 | Reinert | 99/336 |
| 2,546,464 | 3/1951 | Martin | 99/336 |
| 3,260,036 | 7/1966 | De Bellis | 55/223 |
| 3,466,997 | 9/1969 | Hartzog | 99/336 X |
| 3,525,309 | 8/1970 | Katz | 55/223 X |
| 3,608,472 | 9/1971 | Pelster | 99/408 |

*Primary Examiner*—Billy J. Wilhite
*Attorney, Agent, or Firm*—Victor J. Evans & Co.

[57] ABSTRACT

The present invention converts an open top deep fryer into an automatic device in which the foodstuff to be fried is lowered into the frying fat, retained there for a predetermined pre-set time and then automatically raised out of the fat for use. The mechanism in one form of the invention includes a cover for preventing any of the fumes from the fat from escaping to the atmosphere. A blower and washer are provided for drawing off the cooking fumes and passing them through a water spray for cleaning both fats and odor therefrom before releasing the air to the atmosphere. Both cooking trays and baskets are provided so as to permit the cooking of all types of deep fat fried foods.

6 Claims, 7 Drawing Figures

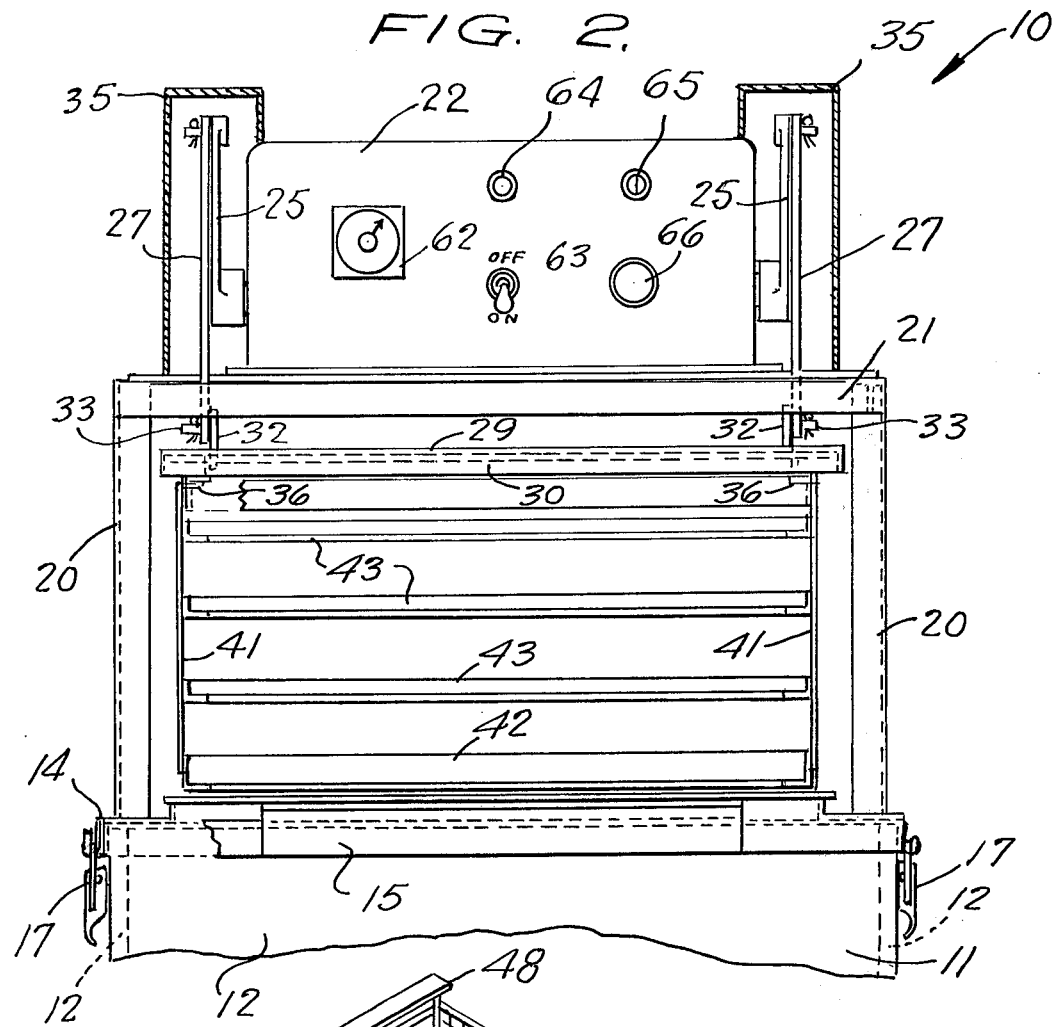
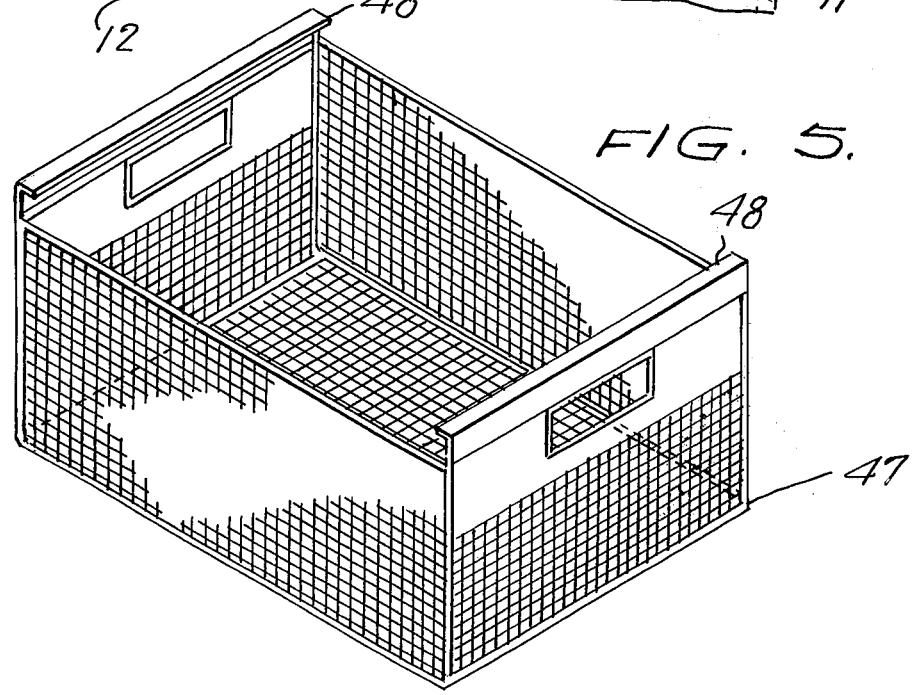

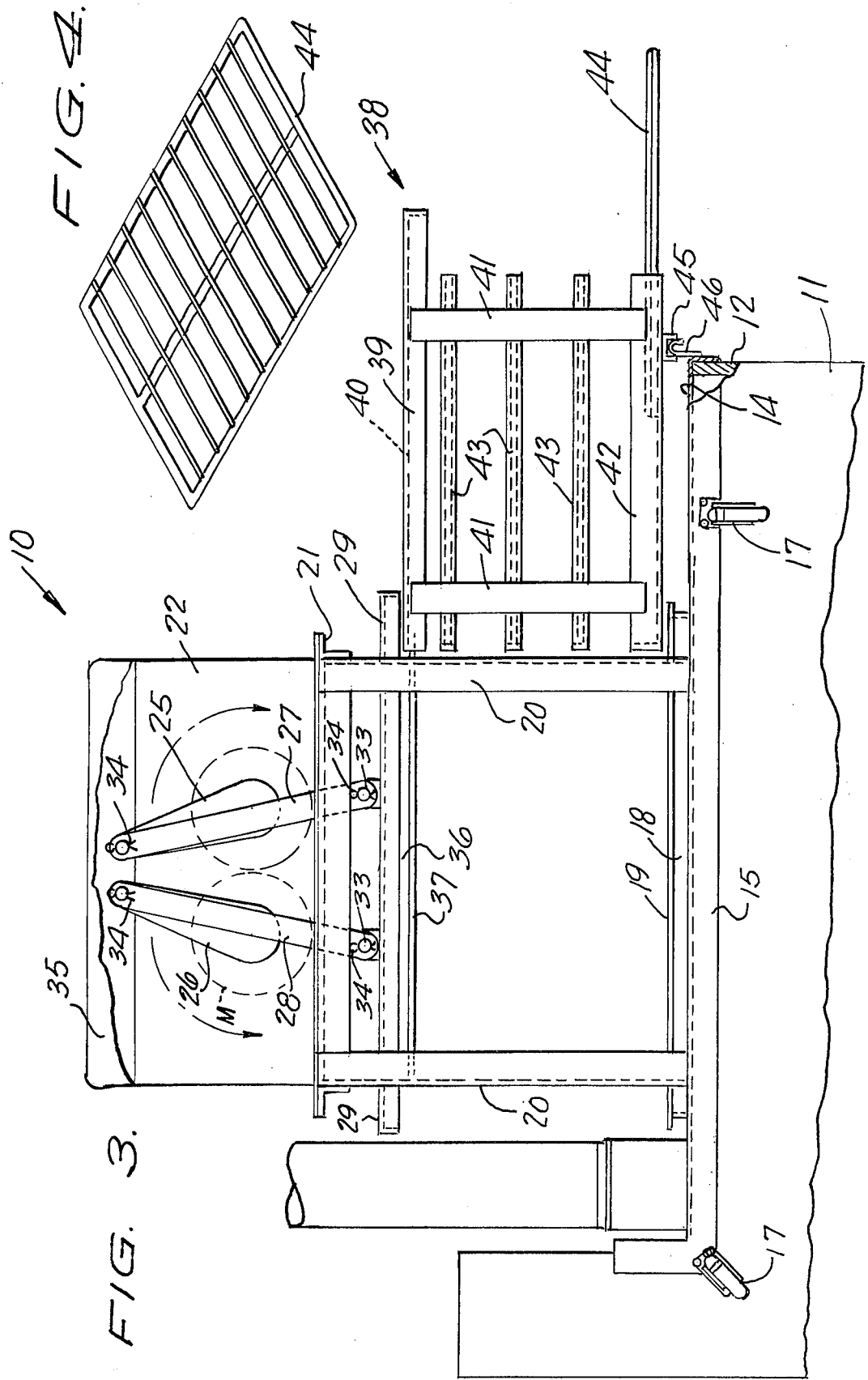

[4,031,820]

AUTOMATIC LIFTING AND LOWERING MECHANISM FOR DEEP FRYERS

BACKGROUND OF THE INVENTION

SUMMARY OF THE INVENTION

The primary object of the invention is to convert an open top deep fat fryer to an automatic fryer.

Other objects and advantages will become apparent in the following specification when considered in light of the attached drawings.

BRIEF DESCRIPTION OF THE DRAWINGS

FIG. 2 is an end elevation of the invention;

FIG. 3 is a side elevation of the invention taken from the side opposite to FIG. 1 with the lifting mechanism in raised position;

FIG. 4 is a perspective view of one of the food racks used with the invention;

FIG. 5 is a perspective view of a food basket used with the invention;

DESCRIPTION OF THE PREFERRED EMBODIMENT

Figure 1:
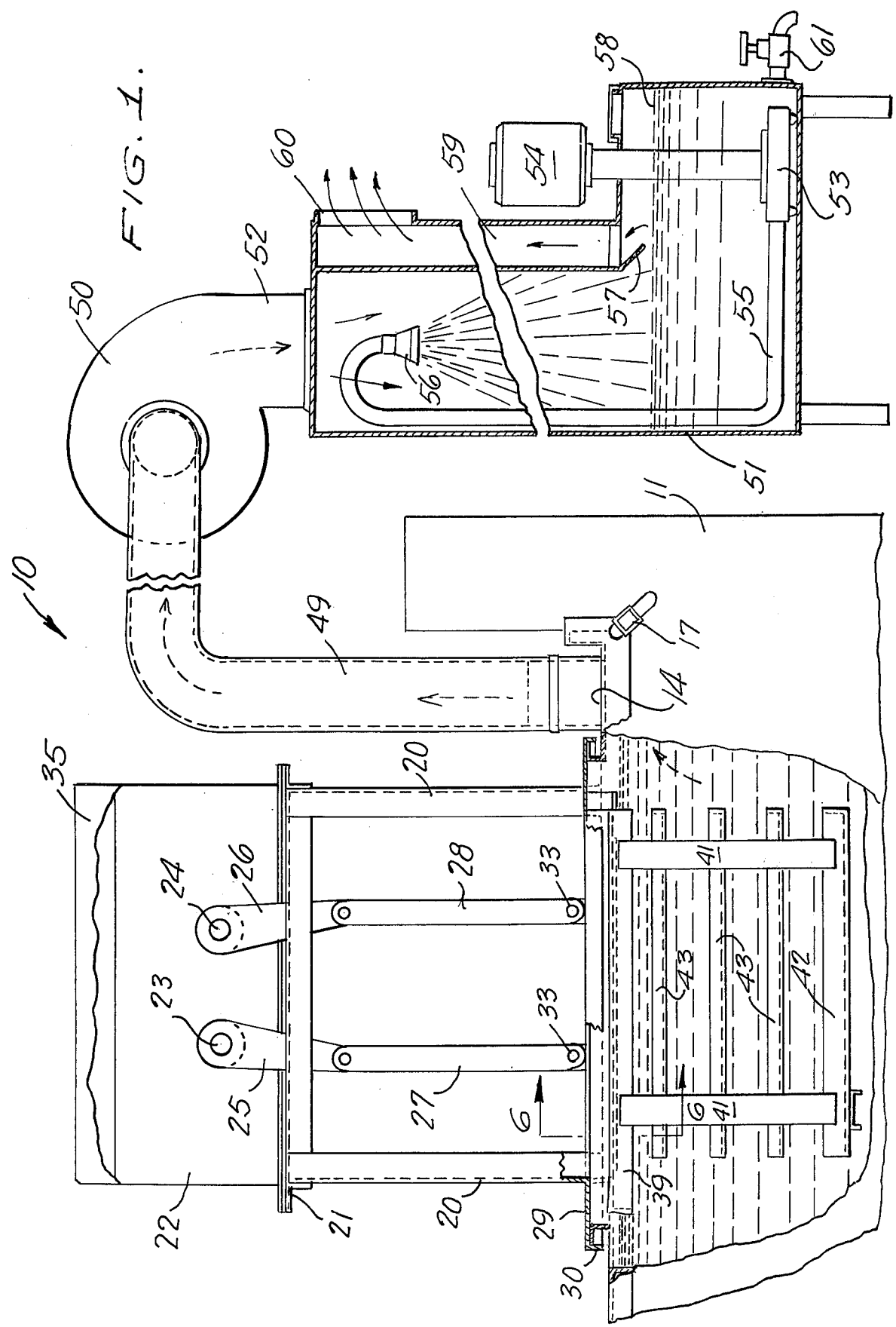
FIG. 1 is a side elevation of the invention shown partially broken away and in section for convenience of illustration.

Referring now to the drawings in detail wherein like reference characters indicate like parts throughout the several Figures the reference numeral 10 indicates generally an automatic lifting and lowering mechanism for deep fryers.

The mechanism 10 is adapted for use with a conventional deep fryer 11 having upstanding walls 12 which terminate in a semi-cylindrical upper edge 13 surrounding the normally open top of the deep fryer 11.

A generally flat cover 14 is provided with a depending flange 15 along its outer edge and has a gasket 16 on the under side thereof to engage the top edge 13 of the walls 12 to thus seal the cover 14 to the deep fryer 11. A plurality of clasps 17 secure the cover 14 tightly to the fryer 11.

An upstanding flange 18 surrounds a generally rectangular opening in the cover 14 and projects upwardly therefrom terminating in a generally horizontal flange 19 arranged in spaced parallel relation to the cover 14. Four angle iron legs 20 are secured to the cover 14 at their lower ends and extend perpendicularly upwardly to support a generally rectangular horizontal frame 21 spaced substantially above the cover 14 and parallel thereto. A generally rectangular drive and control box 22 is mounted on the frame 21 and includes a pair of shafts 23-24 journalled therein and extending out both sides thereof. The shafts 23-24 are driven oppositely and synchronously by an electric motor M within the box 22. A crank link 25 is rigidly secured to the shaft 23 and a crank link 26 is rigidly secured to the shaft 24 on each side of the box 22. A link 27 is pivotally connected to the end of the crank link 25 opposite the shaft 23 and a link 28 is pivotally connected to the end of the crank 26 opposite the shaft 24.

Figure 6:
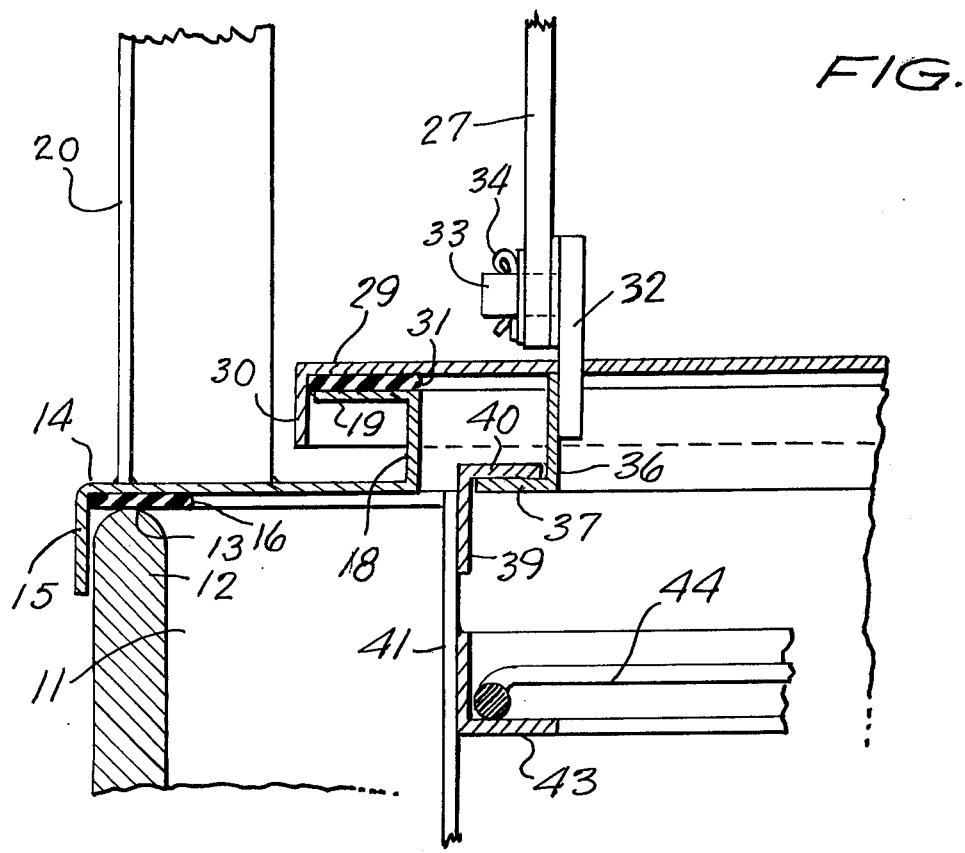
FIG. 6 is an enlarged fragmentary sectional view taken on the line 6—6 of FIG. 1 looking in the direction of the arrows with the lifting mechanism in lowered position.

A generally flat cover 29 has a depending flange 30 along its outer edge and is adapted to engage over the flange 19 as can be clearly seen in FIG. 6. A gasket 31 on the under side of the cover 29 is adapted to contact the flange 19 to prevent escape of cooking fumes through the opening in the cover 14 surrounded by the flange 18.

A plurality of brackets 32 are secured to the cover 29 and extend above and below the cover 29. A shaft 33 extends horizontally from each of the brackets 32 above the cover 29 with the lower ends of the links 27-28 being pivotally mounted thereon. Quick release keys 34 secure the links 27-28 to the shafts 33 and to the crank links 25-26 respectively.

Covers 35 on each side of the box 22 protect the drive linkage in its operation.

A pair of generally horizontal angle iron supports 36 are secured to a pair of the brackets 32 with the supports 36 being arranged in spaced parallel relation with their lower flanges 37 projecting outwardly to form a pair of tracks. A rack generally indicated at 38 is provided with an inverted angle iron U-shaped frame 39 at its top edge and having facing generally horizontal top flanges 40 which are adapted to engage over the flanges 37 on each side of the rack 38 to permit the rack 38 to be slid from a position beneath the cover 29 to a position to one side of the cover 29 for loading and unloading foodstuffs therefrom.

Figure 7:
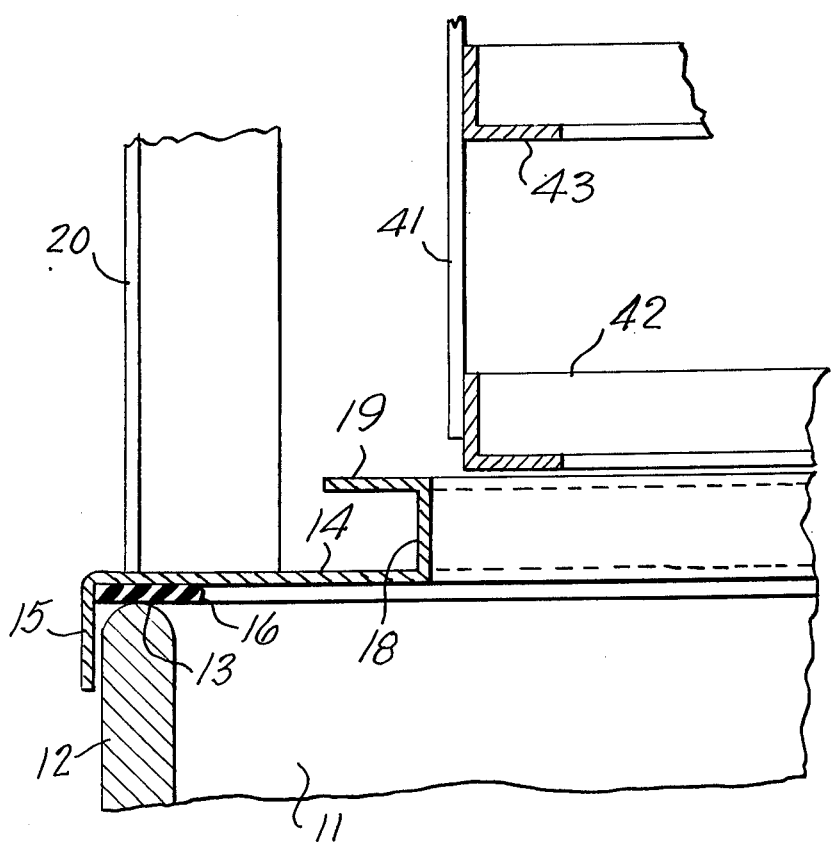
FIG. 7 is a view similar to FIG. 6 with the lifting mechanism in raised position.

The rack 38 includes a pair of upright bars 41 on each side thereof arranged in spaced parallel relation with the bars 41 being secured at their top edges to the generally U-shaped frame 39. A second generally U-shaped angle iron frame 42 is secured to the lower ends of the bars 41 as can be seen in FIG. 7 and a plurality of intermediate U-shaped frames 43 are arranged in vertically spaced parallel relation within the rack 38 and secured to the side bars 41. A food support rack 44 is removably supported on each of the frames 42-43 for cooking relatively large portions of foodstuff such as chicken.

A transverse channel 45 is secured to the under side of the rack 38 for engagement with a support 46 secured to the cover 14 for supporting the rack 38 when it is in its extended position as illustrated in FIG. 3.

A generally rectangular food basket 47 formed of wire mesh is provided with a pair of in turned flanges 48 at opposite ends thereof which are adapted to engage the tracks 37 of the angle iron supports 36 as a replacement for the rack 38 when cooking french fried potatoes and other similar small food items.

A conduit 49 extends upwardly from the cover 14 communicating with the interior of the deep fryer 11 and extending to a rotary blower 50. A gas washing tank 51 is positioned adjacent the deep fryer 11 and has the outlet end 52 of the blower 50 communicating with the upper end thereof. A pump 53 driven by an electric motor 54 has an outlet conduit 55 extending to a spray head 56 in the upper end of the tank 51 for providing a spray bath of water through which the fumes are pumped by the blower 50. A baffle 57 is positioned in the tank 51 just above the level 58 of the water in the tank 51 to cause the gases to move across the surface of the water 51 as they then pass upwardly through a conduit 59 before escaping through the outlet 60 from the tank 51. A drain valve 61 on the tank 51 is provided for draining off the water as it becomes contaminated and needs replacing.

The box 22 is provided with a timer 62 for controlling the length of time that the food is permitted to remain in the cooking fat. A switch 63 is provided for controlling the power through the mechanisms in the box 22. A green pilot light 64 is lit whenever the power is on. A red pilot light 65 is lit whenever the food is in its lowered position in the cooking fat. A push button 66 is provided for controlling the lowering of the food into the cooking fat with the timer 62 controlling the raising of the food from the cooking fat.

The cover 14 may be replaced with frame members and the cover 29 omitted if a less expensive unit is desired.

Having thus described the preferred embodiments of the invention it should be understood that numerous structural modifications and adaptations may be resorted to without departing from the spirit of the invention.

What is claimed is:

1. An automatic lifting and lowering mechanism for attachment to deep fryers of the type having an open top comprising a detachable cover for the open top of the deep fryer, a generally rectangular central opening formed in said cover, a generally rectangular horizontal frame arranged in upwardly spaced relation to said opening in said cover, a plurality of legs extending upwardly from said cover supporting said frame, a movable cover for closing the opening in said first named cover, a food support suspended below said movable cover, means on said frame for raising and lowering said movable cover and the food support suspended therebeneath vertically to simultaneously immerse food on said food support in said deep fryer and covering the opening in said first named cover, and means for automatically raising said movable cover and said food support at the expiration of a predetermined time.

2. A device as claimed in claim 1 wherein said food support comprises a plurality of vertically spaced tracks and a plurality of food racks supported on said tracks.

3. A device as claimed in claim 1 wherein said food support comprises a basket detachably secured to said movable means.

4. A device as claimed in claim 1 wherein the means for raising and lowering said movable cover and said food support includes an electric motor on said frame, a pair of shafts drivably connected to said electric motor and rotatable synchronously in opposite directions, crank arms on each of said shafts and links extending from said crank arms to said movable cover for raising and lowering said movable cover upon rotation of said crank arms.

5. A device as claimed in claim 1 including a cooking fume conduit extending upwardly from said cover, a blower for moving cooking fumes from said deep fryer, and means connected to said blower for washing the fumes from said deep fryer to remove cooking odors and fats therefrom.

6. A device as claimed in claim 5 wherein the means for removing cooking odors and fat from said fumes includes a water spray bath through which the cooking fumes pass prior to escape to the atmosphere.

* * * * *